(12) United States Patent
Wood et al.

(10) Patent No.: US 9,317,395 B2
(45) Date of Patent: Apr. 19, 2016

(54) USAGE REPORTING FROM A CLOUD-HOSTED, DISTRIBUTED SYSTEM

(75) Inventors: Kevin Wood, Seattle, WA (US); Salim Alam, Mercer Island, WA (US); Gregory Marshall Burgess, Redmond, WA (US); Colin Watson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 781 days.

(21) Appl. No.: 13/327,122

(22) Filed: Dec. 15, 2011

(65) Prior Publication Data

US 2013/0124720 A1 May 16, 2013

Related U.S. Application Data

(60) Provisional application No. 61/559,566, filed on Nov. 14, 2011.

(51) Int. Cl.
| | | |
|---|---|---|
| *G06F 17/30* | (2006.01) | |
| *G06F 15/16* | (2006.01) | |
| *G06F 11/34* | (2006.01) | |

(52) U.S. Cl.
CPC ........ *G06F 11/3495* (2013.01); *G06F 11/3409* (2013.01); *G06F 2201/88* (2013.01)

(58) Field of Classification Search
CPC ... H04L 12/14; H04W 52/0251; G06F 17/30; G06F 15/16
USPC ........................................................ 709/224
See application file for complete search history.

(56) References Cited

U.S. PATENT DOCUMENTS

| | | | | |
|---|---|---|---|---|
| 7,493,394 | B2 * | 2/2009 | Zavalkovsky et al. | 709/225 |
| 7,908,358 | B1 * | 3/2011 | Prasad et al. | 709/224 |
| 8,352,931 | B2 * | 1/2013 | Hwang et al. | 717/168 |
| 2002/0091811 | A1 * | 7/2002 | Schweitzer et al. | 709/223 |
| 2005/0246434 | A1 * | 11/2005 | Bantz et al. | 709/223 |
| 2009/0168680 | A1 * | 7/2009 | Singh et al. | 370/312 |
| 2010/0050172 | A1 | 2/2010 | Ferris | |
| 2010/0090823 | A1 * | 4/2010 | Park et al. | 340/539.1 |
| 2010/0115091 | A1 * | 5/2010 | Park et al. | 709/224 |
| 2010/0131624 | A1 | 5/2010 | Ferris | |
| 2011/0010339 | A1 | 1/2011 | Wipfel et al. | |
| 2011/0016214 | A1 | 1/2011 | Jackson | |

(Continued)

OTHER PUBLICATIONS

Clayman, et al., "Monitoring Service Clouds in the Future Internet", In Proceedings of Towards the Future Internet—Emerging Trends from European Research, Apr. 15-16, 2010, pp. 115-126.

"High performance Computing Cloud Offerings from IBM", Retrieved on: Nov. 1, 2011, Available at: http://www-03.ibm.com/systems/deepcomputing/solutions/cloud/cloud_offerings.html.

(Continued)

*Primary Examiner* — Brian J Gillis
*Assistant Examiner* — Juan C Turriate Gastulo
(74) *Attorney, Agent, or Firm* — Henry Gabryjelski; Doug Barker; Micky Minhas

(57) ABSTRACT

Collecting usage data in a cluster computing environment. A method includes at a tracker service receiving a request from an at least partially cloud based deployment for an interval for the deployment to report usage information in usage reports. The usage information includes information defining how software in a deployment is used. In response to the request from the deployment, the method further includes, the tracker service providing an interval to the deployment. The method further includes at the tracker service, receiving usage reports from the deployment according to the provided interval.

17 Claims, 6 Drawing Sheets

(56) References Cited

U.S. PATENT DOCUMENTS

| | | | |
|---|---|---|---|
| 2011/0055712 A1 | 3/2011 | Tung et al. | |
| 2011/0131645 A1* | 6/2011 | Johnson et al. | 726/12 |
| 2011/0213687 A1 | 9/2011 | Ferris et al. | |
| 2011/0295727 A1* | 12/2011 | Ferris et al. | 705/34 |
| 2011/0296000 A1* | 12/2011 | Ferris et al. | 709/224 |

OTHER PUBLICATIONS

Galloway, et al., "Private Distributed Cloud Deployment in a Limited Networking Environment", In Proceedings of the Internet Computing: Policies and Related Issues + Algorithms (ICOMP), Jul. 21, 2011, pp. 6.

* cited by examiner

USAGE REPORTING FROM A CLOUD-HOSTED, DISTRIBUTED SYSTEM

CROSS-REFERENCE TO RELATED APPLICATIONS

This application claims the benefit of U.S. Provisional application 61/559,566 filed Nov. 14, 2011, titled "USAGE REPORTING FROM A CLOUD-HOSTED, DISTRIBUTED SYSTEM", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections.

The connections allow a computing system to access services at other computing systems and to quickly and efficiently receive application data from other computing systems. Further, interconnected computing systems can be used to implement cluster computing systems where several discrete systems work together to accomplish a computing task assigned to the cluster as a whole. Some such systems may have all, or a portion of the cluster deployed in the cloud. Cloud computing allows for computing resources to be provided as services rather than a deliverable product. In particular, computing power, software, information, etc. are provided (for example, through a rental agreement) over a network, such as the Internet.

When software is shipped, it benefits both engineering and marketing to know how it is used. Knowing how customers use the software enables the developer to more effectively target the customers' needs. This issue has been generally addressed in client software installed on personal and enterprise physical computers with solutions like quality management solutions, which enable centralized gathering and sending of pre-configured data points to a receiving server.

However, a cloud-hosted deployment of a high performance computing (HPC) cluster faces additional unique challenges. Cloud deployments can be short lived, such that it may be difficult to gather usage information during the lifetime of a deployed entity. Additionally, excessive data gathering may hinder the high-performance capabilities of the cluster as computing resources are used to gather usage data and may consume excessive bandwidth on a network. Further, the user, in hosted cluster computing environments, typically pays to rent hosted computing resources and network bandwidth and thus any additional use of computing resources and bandwidth will cause the user to incur additional charges.

Usage data gathering may be further complicated by the nature of HPC, in that a typical deployment includes many processes running on many physical or virtual machines which are more loosely connected, and it is not always possible to centralize data gathering functionality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a cluster computing environment where at least a portion of the cluster is deployed in a cloud. The method includes acts for collecting usage data. The method includes at a tracker service receiving a request from an at least partially cloud based deployment for an interval for the deployment to report usage information in usage reports. The usage information includes information defining how software in a deployment is used. In response to the request from the deployment, the method further includes, the tracker service providing an interval to the deployment. The method further includes at the tracker service, receiving usage reports from the deployment according to the provided interval.

Another embodiment illustrated herein is directed to a method practiced in a cluster computing environment where at least a portion of the cluster is deployed in a cloud. The method includes acts for providing usage data. The method includes requesting from a tracker service, an interval in which to send usage data reports. The usage data reports include information defining how software in a deployment is used. The method further includes receiving from the tracker service the interval. The method further includes sending usage data reports to the tracker service based on the interval.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments include functionality for gathering and reporting usage information in cluster computing environments. Some embodiments may be able to provide business intelligence data for the developer. In particular, these embodiments may be able to collect usage data from a customer deployment. The usage data can be used by a developer to improve elements of future (or present) customer deployments or can be used to change how elements are marketed.

Alternatively or additionally, embodiments can monitor the usage of a service that creates cloud-hosted cluster deployments, thus reporting usage of the service that creates these clusters. This can benefit developers or others for future deployments of cloud-hosted cluster deployments or to optimize current cloud-hosted cluster deployments.

Figure 1:
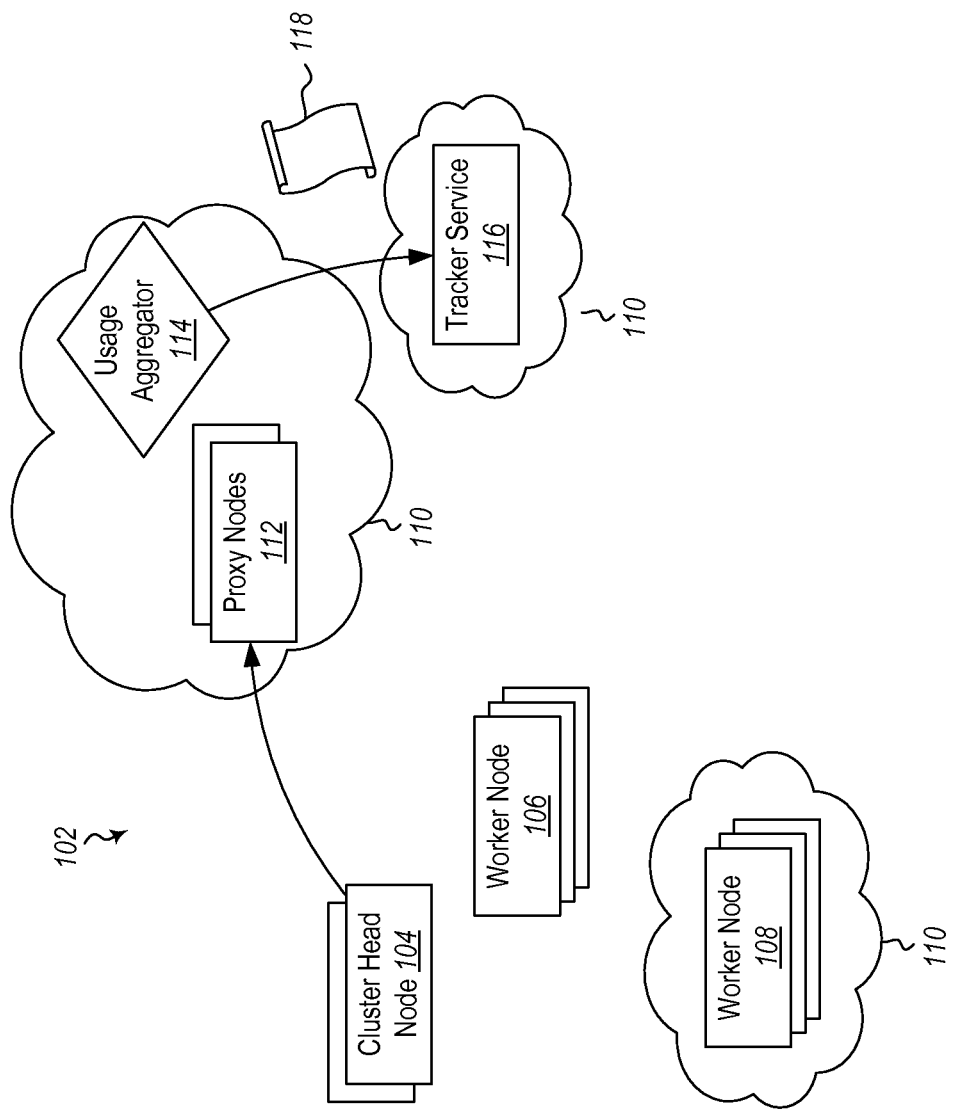
FIG. 1 illustrates a system collecting user usage data.
Figure 2:
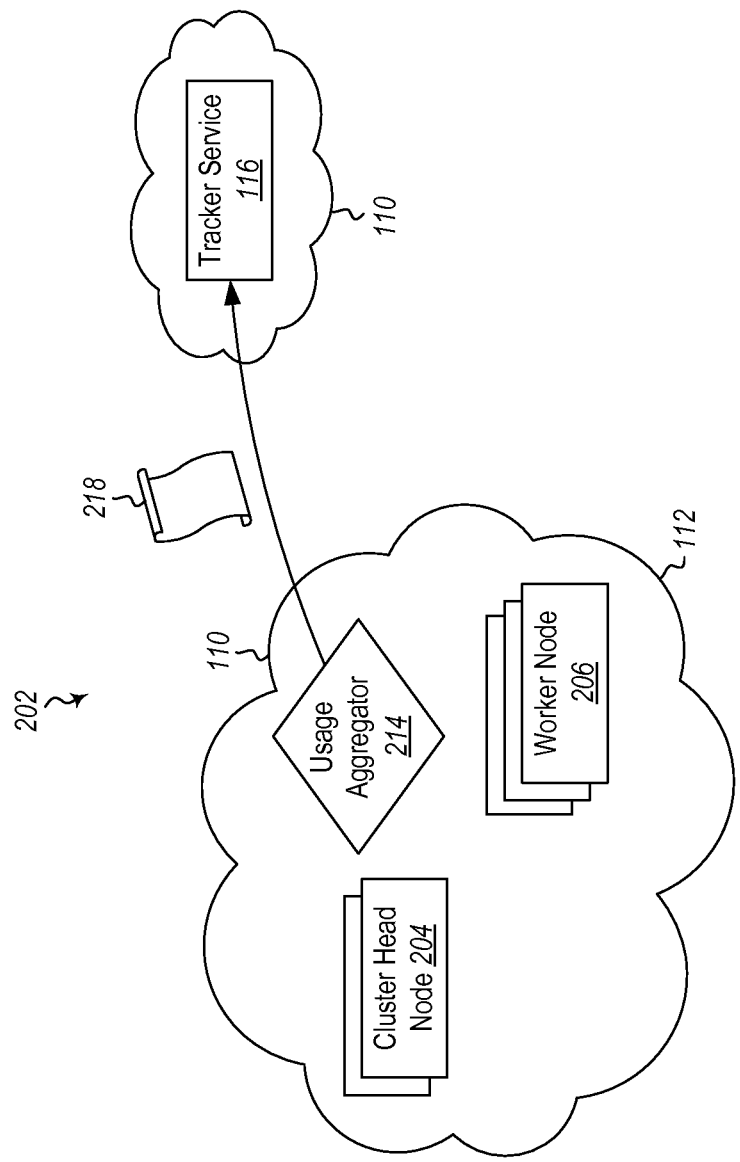
FIG. 2 illustrates another example of system collecting user usage data.

FIGS. 1 and 2 illustrate various topologies where some embodiments may be practiced. In particular, some systems allow for two kinds of cloud-hosted cluster deployments: "burst" deployments as shown in FIG. 1, where the on-premises HPC cluster 102, including an on premises head node 104 and a set of on premises worker nodes 106, is augmented with a cloud-hosted set of worker nodes 108 in a cloud 110, and "cluster" deployments as illustrated in FIG. 2 where the entirety of the cluster 202, including the "head nodes" 204 and worker nodes 206, is Z hosted in the cloud 110. One such system that allows one or both of these functionalities is the HPC Server 2008 R2 available from Microsoft® Corporation of Redmond Wash.

In some "burst" deployments, as illustrated in FIG. 1, a set of nodes 112 (typically two nodes, for high-availability) are designated as proxies for communication with the on-premises head node 104. These proxy nodes 112 are located in the cloud 112 and may be part of a hosting service. These proxy nodes 112 run a usage aggregator module 114. A usage aggregator module 114 runs on a designated set of nodes that function as the helm of the cluster.

However, some embodiments may be implemented where the set of proxy nodes 112 are not used and the usage aggregator module 114 is instead implemented at the on-site cluster head node 104. The usage aggregator module 114 sends usage information, in the form of usage reports to a tracker service 116. The usage information, reporting functionality, and usage reports will be described in more detail below.

In "cluster" deployments, as illustrated in FIG. 2, the head node 204 runs the usage aggregator module 214. Aggregator modules 114 and 214 are set up to collect data about the size and characteristics of the cluster deployment (e.g., either cluster 102 or 104), and cluster deployments additionally collect data about the characteristics of jobs being run on the cluster. For example, usage information may identify the HPC components used.

Alternative implementations may or may not include anything that resembles a head node (e.g., head node 106 or 106) or a proxy (e.g., proxy 112), and the usage aggregator may not collect the same kinds of data. Various implementations contain a usage aggregator module that periodically reports to a central tracker service 116.

Figure 3:
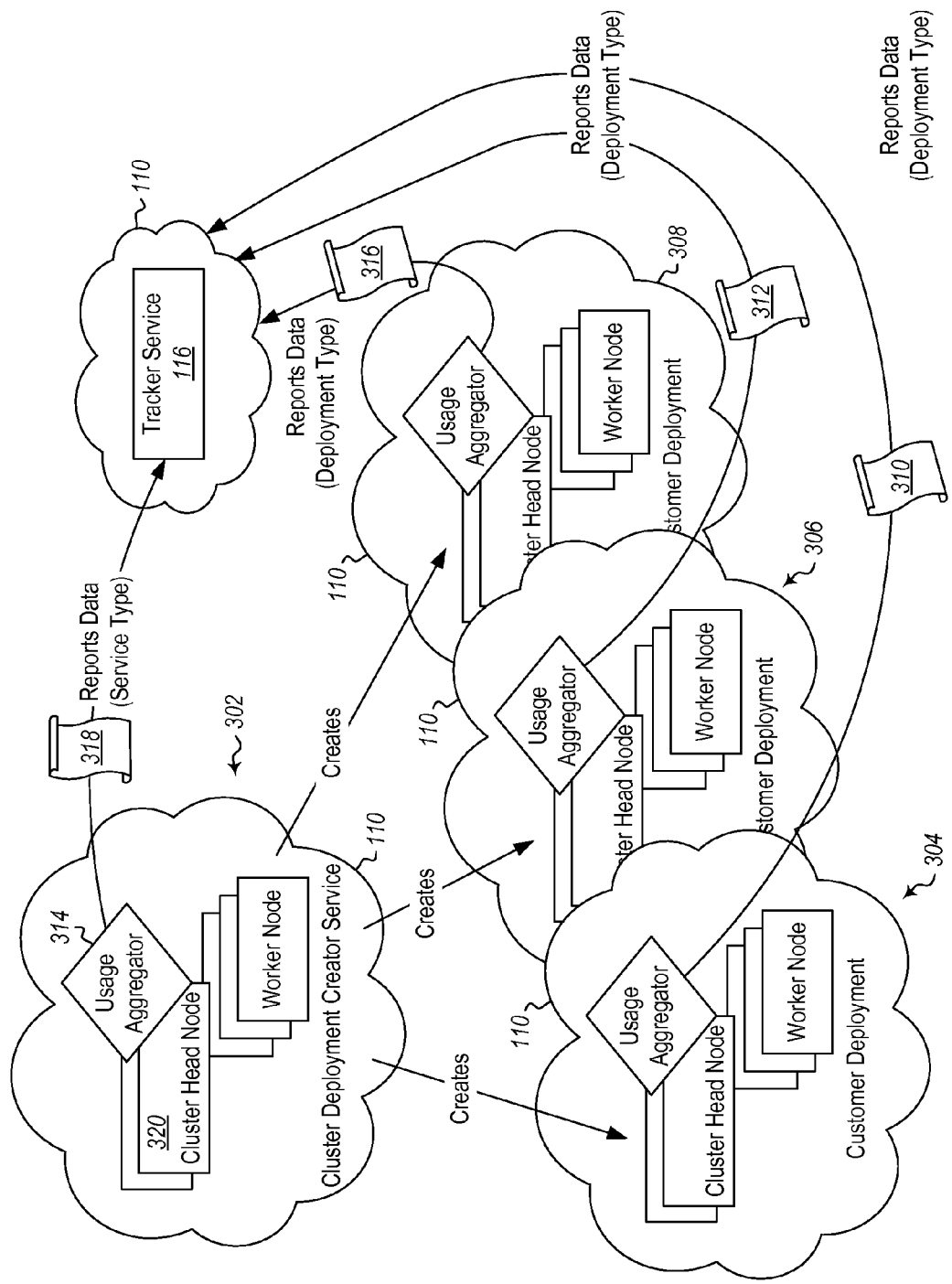
FIG. 3 illustrates another example of a system collecting user usage data.

FIG. 3 illustrates yet another alternative embodiment. Cluster deployment infrastructure may be packaged and used in more complex ways—for example, a web service that can use a cluster deployment to deploy more clusters. FIG. 3 illustrates where a first cluster deployment 302 is used to create other cluster deployments 304, 306, and 308. While each of these cluster deployments 304, 306 and 308 can send usage reports 310, 312, and 316 respectively to the tracker service 116, so too can the first cluster deployment 302 send usage reports 318 to the tracker service 318. This can facilitate future deployment scenarios or be used to optimize a current deployment. Thus, use of a cluster deployment may leverage the generated data for various purposes, which may include (but is not limited to) tracking the number of cluster deployments made by a cloud-hosted cluster-driven service.

Figure 4:
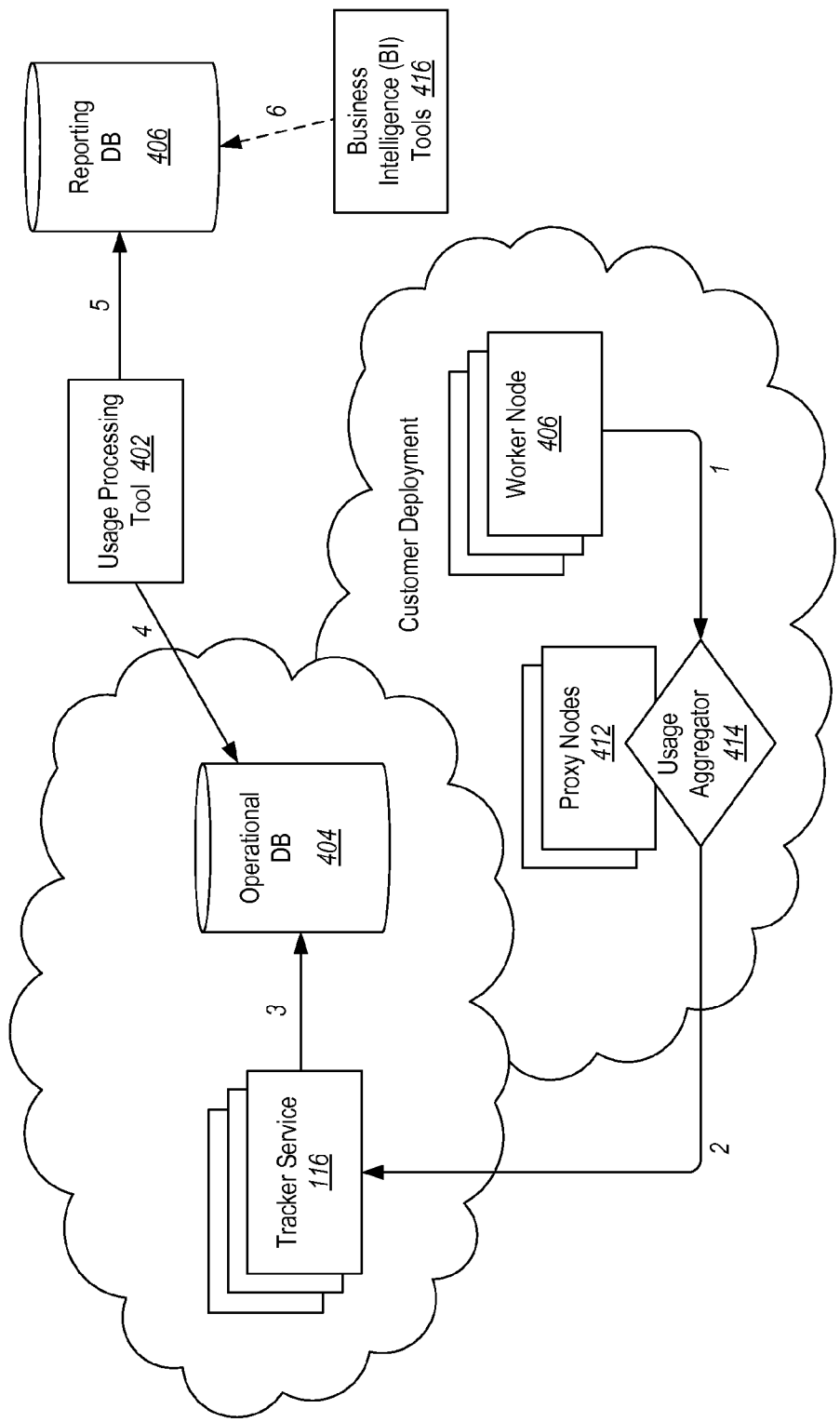
FIG. 4 illustrates another example of a system collecting user usage data.

Reference is now made to FIG. 4, which illustrates additional details. FIG. 4 further illustrates components along with the flow of data to illustrate how usage data might be used. The usage aggregator 414 is used to collect data at a scheduled interval from worker nodes 406. The data is provided to the tracker service 116. The tracker service can store the data in an operational database 404. The data in the operational database 404 can be processed by a usage processing tool 402. As illustrated below, such processing may include, for example, aggregating data or other processing. The processed data can be stored in a reporting database 406. Business intelligence tools 416 can analyze the processed data in the reporting database 406 to make decisions regarding present or future deployments, service marketing, or other decisions. The names of the components in the diagram are specific to one implementation of the invention and are merely illustrative.

FIG. 4 illustrates a usage processing tool 402 that is used in some embodiments. In one implementation, the usage processing tool 402 processes duplicate data from the tracker service's 116 operation database 404 as it moves the data to long-term storage in the reporting database 406. In some embodiments, duplicates may be recognized by comparing a deployment identifier across usage reports. In particular, identifiers may be used by usage aggregators to identify from which deployment usage data comes from. Multiple (duplicate or otherwise) usage reports may be sent from a single deployment in a given reporting interval as the result of having multiple reporting elements, such as multiple usage aggregators in a single deployment. Multiple aggregators may be used to ensure aggregation functionality is available even when there is some system failure. When multiple reports are found, the reports can be aggregated. For example, in some embodiments, the reports may be merged by totaling the usage from each. Various other aggregation activities will be discussed in more detail below.

Illustrating now further details of various embodiments, embodiments may attempt to minimize usage of network resources. In some embodiments, this may be done by using a module (illustrated herein as a "usage aggregator," examples of which are illustrated at 114, 214 and 314 in the various Figures) that runs on a designated set of nodes that function as the helm of the cluster. This module reports usage to a central tracker service 116. At a scheduled interval, which is configured by the central tracker service 116, the aggregator module will collect usage data and report it. In some embodiments, the usage data may be reported in usage reports, such as usage reports 118, 218, 310, 312 and 316. Although the aggregator module can be made highly available by running multiple instances across the designated set of nodes, some embodiments may be such that only a single "active" instance collects the bulk of the data. Each aggregator module also provides a service accessible to cluster nodes. This service allows cluster nodes to report usage data that is not available to the aggregator module, so that later, the aggregator module can report it to the central tracker service 116.

Because multiple aggregator instances may be reporting to the central tracker service 116, there could be duplication of usage data from a single cluster deployment. A usage processing tool 402 can be used against the central tracker service database 404 to filter the duplicate data before it is migrated to long-term storage 406.

As illustrated above in FIG. 3, the cluster deployment is first and foremost a platform for executing distributed workloads, and as such, a cluster can be used to run a service for deploying new cloud-hosted clusters on behalf of a customer. In such a situation, the usage reporting system built in to the service cluster can be leveraged for generating analytical data that is valuable for managing the business. However, this usage is distinguishable from the usage of customers' cluster deployments. To accomplish this, each cluster is configurable at the time of deployment, and part of this configuration is a unique identifier that corresponds to the identity of the cluster deployment software. Thus, the deployment service cluster can be distinguished as having a unique identity, and the clusters that are deployed by the service can be distinguished from clusters originating from other sources as well. As explained previously, this unique identity can be used, not only for distinguishing usage reports, but also for aggregation activities for usage reports from the same deployment.

Embodiments may implement a multiple-instance data aggregation service that can run on proxy and non-proxy nodes. For example, FIG. 1 illustrates an example where data aggregation can be facilitated using a proxy 112 and an aggregator module 114; FIG. 2 illustrates an example where data aggregation can be facilitated using a head node 204 and an aggregator module 114; and FIG. 3 illustrates an example where aggregation can be facilitated using various head nodes and various aggregators including one instance where a head node 320 and an aggregator 314 are used to report on software usage to deploy other, at least partially in-cloud, deployments.

As noted previously, embodiments may include usage data collection service and duplicate removal processes. Additional examples will be illustrated below in conjunction with FIGS. 5 and 6.

Some embodiments may include functionality for collection of usage data as simulated performance counters. Performance counters are mechanisms for monitoring a single piece of instrumented software. Performance counter may monitor hardware, applications, databases, networks, operating systems, etc. For example, performance counters may measure the number of network requests made to a service or the number of database accesses requested by a service.

Some embodiments may include data 'push' from non-aggregated nodes. A usage aggregator may accept network connections from nodes that do not run a usage aggregator and thus do not directly report usage to the tracker service. Instead, these nodes may send data to the usage aggregator via the cluster's private network, and the aggregator will package all of the cluster data for sending to the tracker service. This is especially useful for minimizing outbound (e.g., to the Internet) network utilization and for minimizing the amount to which cluster nodes are taxed by the usage tracking system.

Some embodiments may include handling usage tracking for short-lived deployments. As noted previously, clusters may report usage before the interval ends, in the event that a shutdown or other significant event occurs. In particular, rather than waiting for a specified interval to elapse before porting usage data, clusters may report usage data as a result of some significant event, such as a system shutdown.

Some embodiments may include XML schema optimized for providing fast meta-data access and flexible querying. In some embodiments, usage data is packaged in XML in such a way that the tracker service can put it directly into the operational database in this form. This allows the tracker service to process more requests, as it is not spending as much time processing data reports. Later on, when time is less important, XML can be processed by the developer. Furthermore, the flexibility of the schema call allow for long-term data storage without the need to re-format the database.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
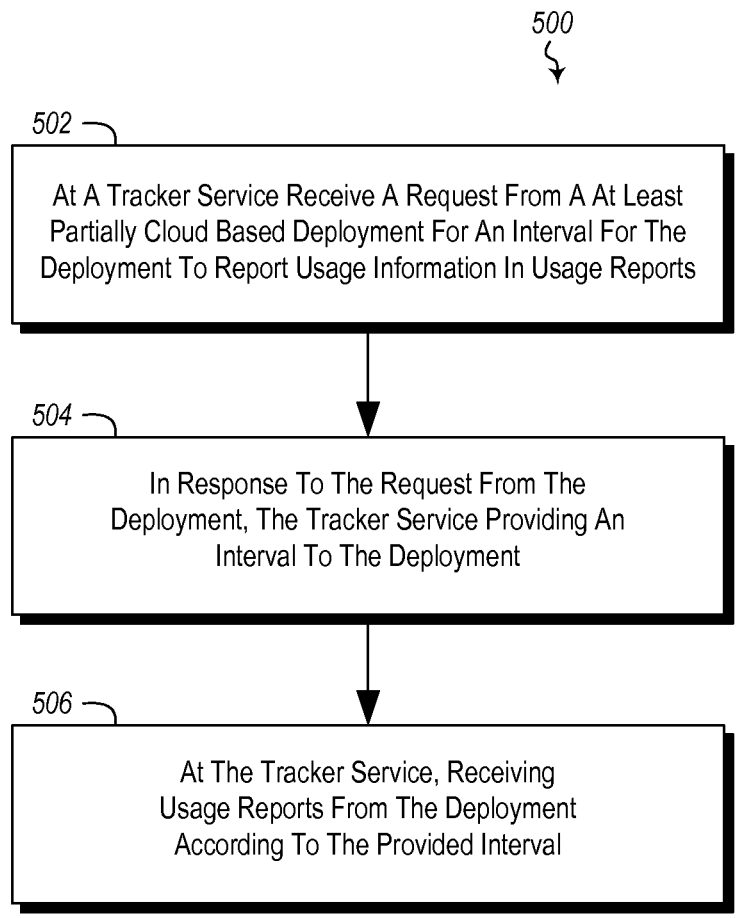
FIG. 5 illustrates a method of collecting usage data.

Referring now to FIG. 5, a method 500 is illustrated. The method 500 illustrates a method practiced in a cluster computing environment where at least a portion of the cluster is deployed in a cloud. The method includes acts for collecting usage data. The method includes, at a tracker service (which in some embodiments is a hosted service hosted by a service provider that may rent computing resources to users) receiving a request from an at least partially cloud based deployment for an interval for the deployment to report usage information in usage reports (act 502). The usage information includes information defining how software in a deployment is used. The usage information includes statistical data about what product features are used, and how successfully they perform. In general, usage information may include data that can be used to infer information that helps to better understand product usage. For example, the tracker service 116 illustrated in the figures may receive requests from usage aggregators (such as usage aggregators 114, 214, or 314) for an interval defining when the usage aggregators should provide usage information.

The method 500 further includes in response to the request from the deployment, the tracker service providing an interval to the deployment (act 504). For example, the tracker service 116 illustrated in the figures may provide an interval to the usage aggregators 114, 214, or 314 defining how often reports with usage information should be provided.

The method 500 further includes at the tracker service, receiving usage reports from the deployment according to the provided interval (act 506). For example, the usage aggregators 114, 214, or 314 may provide usage data to the tracker service 116.

The method 500 may be practiced where receiving usage reports according to the provided interval comprises receiving different data instances from different entities in a single deployment according to the provided interval, and as a result aggregating the different data instances into a single data instance. For example, multiple data providers may provide data usage reports for a single deployment. This may be done for redundancy related to component failure and to overcome any individual failures within a deployment.

The method 500 may further include pruning duplicated data instances received during a single instance of the interval down to a single data instance based on the duplicated data instances coming from a single deployment. For example, if two data usage reports are received that are essentially identical, one of the reports could be discarded. Identical reports could be identified by matching deployment identifiers, time stamps, and/or comparing data in the reports.

The method 500 may further include merging different data instances received during a single instance of the interval into a single data instance based on the different data instances coming from a single deployment. For example, data from different reports in a given interval may be merged to create a single report. In some embodiments, a given deployment may have a given identifier that it could associate with reports. By using the identifiers, and in some embodiments a time stamp, reports can be matched up for merging into a single report.

Embodiments may be practiced where merging different data instances includes selecting a maximum data value from among the different data instances. For example, one value may be a maximum runtime. If two reports have different maximum runtimes for a component, a merge operation will take the longest one and discard the other.

Embodiments may be practiced where merging different data instances includes selecting at least one of an average, mean, or statistical aggregation of data values from among the different data instances. For example, data values could be averaged over different reports occurring during the same interval from the same deployment.

Figure 6:
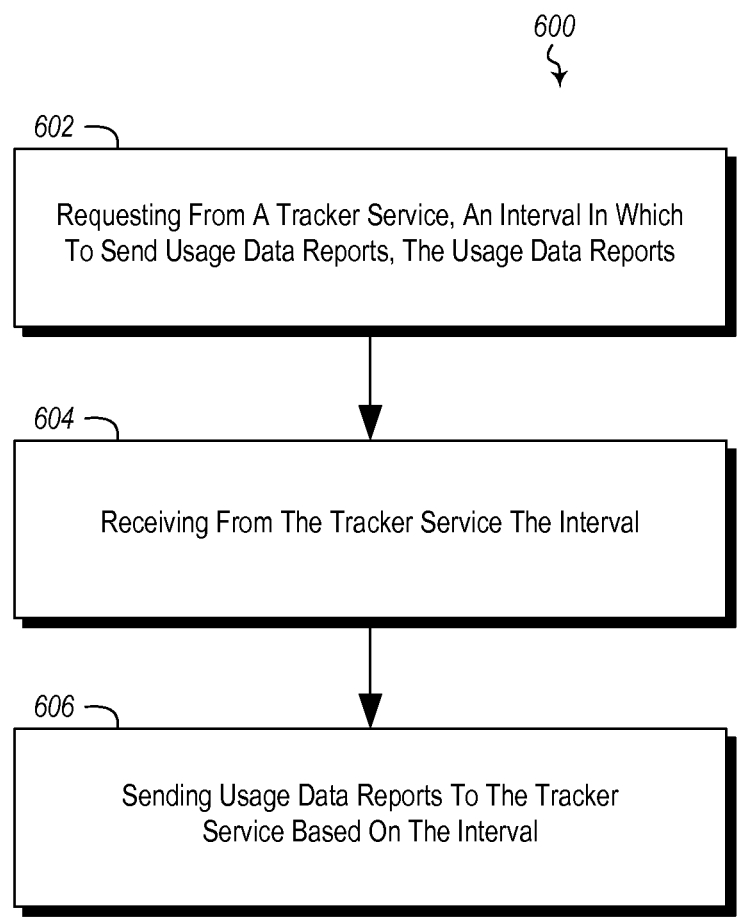
FIG. 6 illustrates a method of providing usage data.

Referring now to FIG. 6, another embodiment is illustrated. FIG. 6 illustrates a method 600 that may be practiced in a cluster computing environment where at least a portion of the cluster is deployed in a cloud. The method 600 includes acts for providing usage data. The method includes requesting from a tracker service, an interval in which to send usage data reports. The usage data reports include information defining how software in a deployment is used (act 602). The method 600 further includes receiving from the tracker service the interval (act 604). For example, a tracker service may indicate how often reports should be sent. Notably, the interval does not need to be strictly periodic meaning that all intervals are the same length of time but can be based on other criteria. The method 600 further includes sending usage data reports to the tracker service based on the interval (act 606).

Embodiments may be implemented where the method is performed in a deployed distributed system, where at least a portion of the deployed system is deployed in a cloud and at least a portion of the deployed system is deployed on-site. Such an example is illustrated in FIG. 1. In this example, the portion of the system that is deployed in the cloud is an extension of the portion of the system that is deployed on site. Some such embodiments may be practiced where sending the usage data reports is performed by a proxy that is part of the cloud deployment that is a delegate for an on-site head node to worker nodes that are in the cloud. As illustrated in FIG. 1, the nodes 112 act as proxies for the head node 104. In some embodiments, this may be done based on licensing restrictions that allow more latitude for data collection from cloud deployed elements than from on-site elements.

Alternative embodiments may be practiced where sending the usage data reports is performed by an on-site head node, such as node 104.

Some embodiments may be implemented where the method is performed in a distributed system where the system is substantially a cloud deployment. Such an example is illustrated in FIG. 2. In some of these embodiments, sending the usage data reports is performed by a cloud based head node, such as node 204 in conjunction with the aggregator module 214 illustrated in FIG. 2.

In some embodiments creating a usage data report may be done by mining a scheduler database for job history. This would show what actions were performed by nodes in a deployment and would thus show software usage.

The method 600 may further include creating the usage data reports by receiving individual reports from nodes in the cluster at a data collection service. This may help to minimize performance hits as there is no need to report to tracker service. This could result in reduced bandwidth use and thus less cost to customers.

The method 600 may further include sending an interim report including usage data at less than the received interval. The interim report includes an indication of an interim interval defining an interval since a last regular report. For example, an extra report may be sent sooner than the defined interval. This may be done, for example, if there is a node shut down event, node error event, or other event.

The usage reports may be used to report various different kinds of usage. For example, FIGS. 1 and 2 illustrate examples where the usage reports report customer usage for a customer that requests that at least a portion of a deployment be hosed in the cloud. Alternatively, as shown in FIG. 3, the usage reports may show usage for at least partially cloud deployed system systems that deploy other at least partially cloud deployed system.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a tracker service in a cluster computing environment, a method of collecting usage data, the method comprising:
   receiving a request from a first cluster deployment comprising a cluster deployment creator service, the request requesting an interval over which a plurality of cluster deployments, including the first cluster deployment as well as at least a second cluster deployment that is created by the first cluster deployment, are to report usage information in usage reports, the usage information defining at least (i) one or more first characteristics of at least one first job that is assigned to the first cluster deployment and that is being run on a plurality of first worker nodes in the first cluster deployment, and (ii) one or more second characteristics of at least one second job that is assigned to the second cluster deployment and that is being run on a plurality of second worker nodes in the second cluster deployment;
   in response to the request from the first cluster deployment, providing the interval to the first cluster deployment;
   receiving a plurality of usage reports according to the interval, including receiving at least:
      (i) a plurality of first usage reports from a plurality of first aggregator instances running in the first cluster deployment, each of the plurality of first usage reports including a first deployment identifier identifying the first cluster deployment and providing usage information for the at least one first job that is being run on the plurality of first worker nodes, and
      (ii) a plurality of second usage reports from a plurality of second aggregator instances running in the second cluster deployment, each of the plurality of second usage reports including a second deployment identifier identifying the second cluster deployment and providing usage information for the at least one second job that is run on the plurality of second worker nodes; and
   identifying duplicate data in the plurality of usage reports, including:
      based on the first deployment identifier, identifying first duplicate data among the plurality of first usage reports regarding the at least one first job, the first duplicate data having been sent by each of at least two of the plurality of first aggregator instances; and
      based on the second deployment identifier, identifying second duplicate data among the plurality of second usage reports regarding the at least one second job, the second duplicate data having been sent by each of at least two of the plurality of second aggregator instances.

2. The method of claim 1, further comprising pruning each of the first duplicate data and the second duplicate data.

3. The method of claim 1, further comprising merging at least two of the plurality of first usage reports and at least two of the plurality of second usage reports.

4. The method of claim 3, wherein the merging comprises selecting a maximum data value.

5. The method of claim 3, wherein the merging comprises selecting at least one of an average, a mean, or a statistical aggregation of data values.

6. The method of claim 1, wherein at least a first portion of the cluster computing environment is deployed in a cloud and at least a second portion of the cluster computing environment is deployed on-site, and wherein one or more of the usage reports are sent by a proxy that is part of the first portion of the cluster computing environment is deployed in the cloud, and which is a delegate for an on-site head node to worker nodes that are in the cloud.

7. The method of claim 1, wherein one or more of the plurality of usage reports are created by mining a database for job history.

8. The method of claim 1, wherein one or more of the plurality of usage reports is created by an aggregator instance corresponding to a particular worker node.

9. The method of claim 1, further comprising receiving an interim report including usage data at less than the interval, wherein the interim report comprises an indication of an interim interval defining another interval since a last regular report.

10. The method of claim 9, wherein the interim report is sent as a result of a worker node beginning a shut down.

11. The method of claim 9, wherein the interim report is sent as a result of an error or other event.

12. The method of claim 1, wherein one or more of the usage reports comprise customer usage data.

13. The method of claim 1, wherein one or more of the usage reports comprise deployment data for a system deployment system.

14. A computer program product comprising one or more hardware storage devices having stored thereon computer executable instructions that, when executed by one or more processors of a computer system, cause the computer system to collect usage data in a cluster computing environment, including the following:

receiving a request from a first cluster deployment comprising a cluster deployment creator service, the request requesting an interval over which a plurality of cluster deployments, including the first cluster deployment as well as at least a second cluster deployment that is created by the first cluster deployment, are to report usage information in usage reports, the usage information defining at least (i) one or more first characteristics of at least one first job that is assigned to the first cluster deployment and that is being run on a plurality of first worker nodes in the first cluster deployment, and (ii) one or more second characteristics of at least one second job that is assigned to the second cluster deployment and that is being run on a plurality of second worker nodes in the second cluster deployment;

in response to the request from the first cluster deployment, providing the interval to the first cluster deployment;

receiving a plurality of usage reports according to the interval, including receiving at least:
- (i) a plurality of first usage reports from a plurality of first aggregator instances running in the first cluster deployment each of the plurality of first usage reports including a first deployment identifier identifying the first cluster deployment and providing usage information for the at least one first job that is being run on the plurality of first worker nodes, and
- (ii) a plurality of second usage reports from a plurality of second aggregator instances running in the second cluster deployment, each of the plurality of second usage reports including a second deployment identifier identifying the second cluster deployment and providing usage information for the at least one second job that is run on the plurality of second worker nodes; and identifying, duplicate data in the plurality of usage reports, including:
- based on the first deployment identifier, identifying first duplicate data among the plurality of first usage reports regarding the at least one first job, the first duplicate data having been sent by each of at least two of the plurality of first aggregator instances; and
- based on the second deployment identifier, identifying second duplicate data among the plurality of second usage reports regarding the at least one second job, the second duplicate data having been sent by each of at least two of the plurality of second aggregator instances.

15. The computer program product of claim 14, further comprising pruning each of the first duplicate data and the second duplicate data.

16. A computer system, comprising:
one or more hardware processors; and
one or more hardware storage devices having stored thereon computer executable instructions representing a tracker service, and wherein the tracker services is configured to perform a least the following:

receive a request a first cluster deployment comprising a cluster deployment creator service, the request requesting an interval over which a plurality of cluster deployments, including the first cluster deployment as well as at least a second cluster deployment that is created by the first cluster deployment, are to report usage information in usage reports, the usage information defining at least (i) one or more first characteristics of at least one first job that is assigned to the first cluster deployment and that is being run on a plurality of first worker nodes in the first cluster deployment, and (ii) one or more second characteristics of at least one second job that is assigned to the second cluster deployment and that is being run on a plurality of second worker nodes in the second cluster deployment;

in response to the request from the first cluster deployment, provide the interval to the first cluster deployment;

receive a plurality of usage reports according to the interval, including receiving at least:
- (i) a plurality of first usage reports from a plurality of first aggregator instances running in the first cluster deployment, each of the plurality of first usage reports including a first deployment identifier identifying the first cluster deployment and providing usage information for the at least one first job that is being run on the plurality of first worker nodes, and
- (ii) a plurality of second usage reports from a plurality of second aggregator instances running in the second cluster deployment, each of the plurality of second usage reports including a second deployment identifier identifying the second cluster deployment and providing usage information for the at least one second job that is run on the plurality of second worker nodes; and identify duplicate data in the plurality of usage reports, including:
- based on the first deployment identifier, identifying first duplicate data among the plurality of first usage reports regarding the at least one first job, the first duplicate data having been sent by each of at least two of the plurality of first aggregator instances; and
- based on the second deployment identifier, identifying second duplicate data among the plurality of second usage reports regarding the at least one second job, the second duplicate data having been sent by each of at least two of the plurality of second aggregator instances.

17. The computer system of claim 16, further comprising pruning each of the first duplicate data and the second duplicate data.

* * * * *